Nov. 26, 1968  M. D. CASELLA  3,412,988
GRID STRUCTURE
Original Filed April 3, 1964
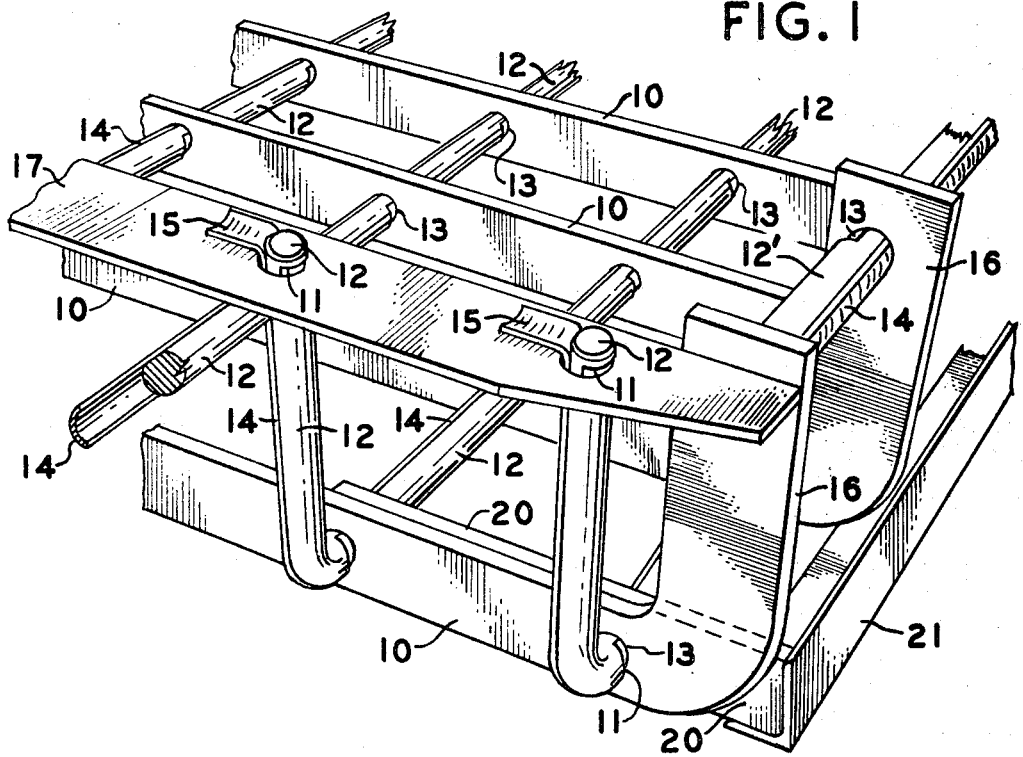
FIG. 1
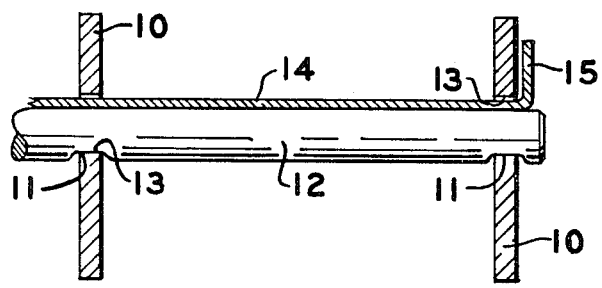
FIG. 2
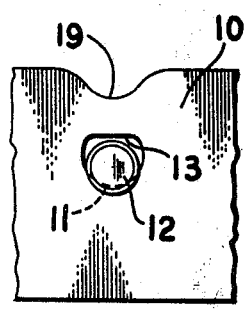
FIG. 4
FIG. 3
INVENTOR.
MICHAEL D. CASELLA
BY
Oberlin, Maky, Donnelly & Renner
ATTORNEYS

United States Patent Office 3,412,988
Patented Nov. 26, 1968

3,412,988
GRID STRUCTURE
Michael D. Casella, Cleveland, Ohio, assignor to Rose Iron Works, Inc., Cleveland, Ohio, a corporation of Ohio
Original application Apr. 3, 1964, Ser. No. 357,243, now Patent No. 3,337,198, dated Aug. 22, 1967. Divided and this application July 10, 1967, Ser. No. 652,121
7 Claims. (Cl. 263—47)

ABSTRACT OF THE DISCLOSURE

A grid structure having a plurality of spaced apart article supporting beam members interconnected by spacer tie bars extending through aligned openings in the beam members in such a manner as to permit expansion and contraction of the grid parts during use with minimal distortion or weakening.

*Cross-reference to related applications*

This application is a division of my prior copending U.S. application Ser. No. 357,243, filed Apr. 3, 1964, now U.S. Patent No. 3,337,198.

*Background of the invention*

The present invention relates to an article of manufacture and more particularly to a processing carrier useful as a work material holding basket, or alternatively, as a relatively flat grid.

In the past for metallurgical, chemical, and mechanical processes, it has been known to use a retriculated or gridiron structure having intersections of the grid secured by various means. For heat treating applications particularly, it is desired to have a low ratio of weight of grid with respect to weight of work material which it can support, so that less heat is required for merely heating process apparatus.

Heretofore, one piece cast grids have been found inordinately heavy, expensive to use, difficult to repair and excessively rigid, that is, lacking in the flexibility necessary to stand up in use, for example with temperature changes due to heating or quenching when part of the grid (e.g., supporting the load) will expand or contract less rapidly than another.

For some of the same reasons, arc or resistance welded grids have been found disadvantageous, the welding failing to properly provide for expansion and contraction of the grid parts due to temperature changes during welding and later during use.

Other constructions have used rivets, swaging, separator tubes and other means to secure grid parts together or position them apart but, for many applications, all have been disadvantageous in one way or another.

*Summary of the invention*

It is an object of the present invention to provide simple and inexpensive means for overcoming the above mentioned difficulties.

Another object of the invention is to provide a relatively strong while losely articulated grid or basket easily capable of taking up expansion and contraction during use with minimal distortion or weakening.

Another object is to provide a fixture useful for metallurgical, mechanical, and chemical processes and characterized by relatively low weight of fixture with respect to relatively high weight of material it is adapted to carry, and which is characterized by the ability to stand up well in use with a relatively long distortion-free life, together with ease of making repairs if need be.

Other objects and advantages will become apparent and the invention may be better understood from consideration of the following description taken in connection with the accompanying drawing.

*Brief description of the drawing*

FIG. 1 is a perspective view of a broken away corner portion of a basket for work material heat treating, brazing, drying, and the like, and made according to the invention;

FIG. 2 is a broken away detail of a load bar, tie bar, and lock strip assembly for providing a lock and clearance type grid according to one embodiment of the invention;

FIG. 3 is a broken away detail showing a grid modification; and

FIG. 4 is a fragmentary end elevation view of the grid of FIG. 3.

*Description of the preferred embodiments*

Referring to the drawings, an articulated basket (FIG. 1) or grid (FIGS. 2 and 3) is simple and inexpensively but ruggedly made and provides clearance (see FIG. 2, and FIG. 3 also) for thermal expansion and consequent long useful life, by having perforate load bars 10 locked apart by spacer notches 11 (see FIG. 2) provided in cross members 12. As indicated in FIGS. 2 and 3, and assumed for FIG. 1, a separate notch 11 locks load bar 10 (although through a clearance) at cross member 12.

The basket (FIG. 1) or grid (FIG. 2) parts may all be made from the same suitable material such as steel, although for many uses an alloy highly resistant to high temperatures and corrosion, such as a chrome or chrome-nickel steel alloy, may be preferred.

Holes 13, having a generally rounded contour are provided in the load bars 10 for receiving the cross members 12, there being sufficient clearance for introducing the cross members 12 until the latter have had their notches fall into place around contiguous portions of the runners 10. Into such clearances, as found aligned (FIG. 2) or as used together (FIG. 1), are slipped generally curved or rounded lock strips 14 which may desirably be arcuate in section for mating engagement with both the rounded contour of the holes 13 and the adjacent rounded surface of the cross members 12 as shown in FIG. 1. The lock strips 14 may be fastened against removal by bending the end portions of the strips to form holding tabs 15.

I wish it to be understood that a flat grating, as is indicated in the "portion" showings in FIGS. 2 and 3, might be used as it is. Or it might be slipped into angle or other shaped sides to form a basket. Alternatively, it could have its own components upturned at their lateral extents to form an integral "basket" as in FIG. 1, where the runners 10 terminate in upstanding portions 16 finally spaced apart by elevated cross members one of which is shown at 12' and which is notched as before and held in place by a lock strip 14 as before. The lower cross members 12 also turn up, and they terminate in side rails, one of which is shown at 17.

For the FIG. 2 arrangement (hence for the assumed FIG. 1 arrangement as well) the root, or limiting dimension, of each notch 11 can be 101 to 150% of the thickness dimension of the runner 10 which it holds, transversely through the clearance.

Referring to FIGS. 3 and 4, there is still a separate notch 11 for spacing and locking every load bar 10 at every intersection with a cross member 12, but in FIG. 3 the expense of the FIGS. 1 and 2 locking strip 14 is completely eliminated by "coining" down depressions 19 on an outer surface of each load bar 10 adjacent each of its engagements with a cross member 12 thus to take up the radial clearance and lock the members together. That is to say, although when cross member 12 was first inserted, the top side of each opening 13 may have been as indicated by the dash lines 13' in FIG. 3, after exerting a deforming pressure to form each dimple 19, the top of each opening 13 has been pushed down to the top of the cross member 12, thus locking the notches 11 which engage each respective load bar 10. An advantage of the FIG. 3 arrangement is that for many applications it is desirable because of its low initial cost.

Accessories which vary with uses and individual customer requirements may optionally be used. Conventionally, accessories sometimes used include stacking rails, pusher bars, handles or other lifting devices, frames and other supporting structures, and liners. In FIG. 1, I have shown a relatively short interlock bar 20 (of which there would be four per basket). Angle bumpers (of which one is shown at 21, welded to bar 20) serve as both pusher bars and stacking rails (so that like baskets may be superimposed one above the other for processing or for storage). Preferably, such angle bumpers are welded to the rest of the structure at just a few points (so as not to interfere materially with contractions or expansions). Preferably, too, the interlock bars are locked into notches provided in the cross members, in the same manner as are the load bars.

There is thus provided articles of the class described capable of meeting the objects above set forth. The articulated joints minimize heat stresses, as is always advantageous since customers may merely order "processing baskets" or "grids" without the supplied (or sometimes even the customer) knowing that they will ultimately be subjected to processes involving wide swings of temperature. Still a high strength to weight ratio is achieved, and all necessary beam strength is maintained, neither the small notches 11 in the cross members, nor the holes 13 through the generally central portion of each on-edge beam (that is, through the point of minimum stress) materially affecting the strength of these members in their particular application.

Other modes of applying the principles of the invention may be employed, change being made as regards the details described, provided the features stated in any of the following claims or the equivalent of such be employed.

I, therefore, particularly point out and distinctly claim as my invention:

1. A grid structure for use as a processing carrier to support a material load comprising a plurality of spaced substantially parallel load support members having a plurality of aligned openings at spaced intervals along their lengths, a plurality of elongated bar members extending through such aligned openings, said bar members having axially spaced apart notches in which a portion of the walls of such openings is received, said walls having been deformed subsequent to insertion of said elongated bar members through said openings for reducing the clearance between said bar members and said walls to preclude removal of said bar members therefrom without the use of locking strips and the like.

2. The grid structure of claim 1 wherein the contour of such openings is generally round and said bar members are generally round in section, whereby said depressions in the wall of such openings reduce the radial clearance between said bar members and the wall of such openings to preclude removal of said bar members therefrom as aforesaid.

3. The grid structure of claim 1 wherein depressions are formed in an edge of said load support members adjacent such openings therein, said depressions extending radially inwardly of such openings to displace the walls of such openings toward said bar members for reducing the clearance therebetween as aforesaid.

4. The grid structure of claim 3 wherein said depressions are the sole means by which the clearance between said bar members and the wall of such openings is reduced to preclude removal of said bar members therefrom.

5. The grid structure of claim 1 further comprising an elongated bumper member, and means for securing said bumper member to said grid structure adjacent one end of said load support members, including a pair of interlock bars having one end extending outwardly beyond said one end of said load support members to which said bumper member is secured, said interlock bars being substantially shorter than said load support members and having several axially spaced openings therein in alignment with the openings in said load support members adjacent said one end for passage of said elongated bar members therethrough, said several elongated bar members having additional aligned notches therein for receipt of a portion of the wall of said interlock bar openings, and means for maintaining said interlock bars within said additional notches.

6. The grid structure of claim 1 wherein said elongated bar members have upturned end portions outwardly of said load support members, aligned notches in said upturned end portions, and side rails having spaced apart openings therein for receipt of said upturned end portions with a portion of the wall of such rail openings disposed in such notches, and means for maintaining said side rails within such notches in said bar member end portions.

7. A grid structure for use as a processing carrier to support a material load comprising a plurality of spaced substantially parallel load support members having a plurality of aligned openings at spaced intervals along their lengths, a plurality of elongated bar members extending through said aligned openings, said bar members having axially spaced apart notches in which a portion of the walls of said openings is received, elongated lock members extending through said aligned openings for maintaining said load support members within said notches, an elongated bumper member, and means for securing said bumper member to said grid structure adjacent one end of said support members, including a pair of interlock bars having one end extending outwardly beyond said one end of said support members to which said bumper member is secured, said interlock bars being substantially shorter than said support members and having several axially spaced openings therein in alignment with the openings in said support members adjacent said one end for passage of several of said bar members and lock members therethrough, said several bar members having additional aligned notches therein for receipt of a portion of the walls of said interlock bar openings, said several lock members being adapted to maintain said interlock bars within said additional notches.

References Cited

UNITED STATES PATENTS 3,025,045  3/1962  Ornitz.

JOHN J. CAMBY, *Acting Primary Examiner.*